Patented Dec. 18, 1928.

1,695,639

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

LIQUID COMPOSITION CONTAINING CHLORINATED RUBBER.

No Drawing. Application filed May 5, 1923, Serial No. 636,987. Renewed April 30, 1925.

This invention relates to a liquid composition containing chlorinated rubber and relates to compositions especially adapted for coating purposes containing rubber which has been chlorinated in an extensive manner so as to yield a compound containing more than two-thirds of its weight (i. e. more than 66⅔%) of combined chlorine.

The chlorinated rubber which I preferably employ for the purpose herein described is obtained by the persistent chlorination of rubber for example ordinary raw unvulcanized rubber the chlorination preferably being carried out under pressure and preferably at temperatures slightly elevated above room temperature so as to produce what may be termed a perchlorinated rubber. Preferably I carry the chlorination to yield chlorinated material containing combined chlorine in a proportion which would indicate the octa-, nono-, deca-chlorinated bodies, and even higher stages of chlorination. The solubility as a general rule increases rapidly with the degree of chlorination and the quality of quickly drying when a solution in a volatile solvent is exposed in a thin layer is favored by the use of the perchlorinated material. A chlorination of this degree also renders unlikely the presence of any unchlorinated rubber in the composition. The latter generally is undesirable because it retards the drying and renders the surface tacky for an indefinite period.

For the purposes of the present invention a chlorinated rubber is employed which is capable of drying quickly to form a hard tough coating preferably possessing a brilliant glossy finish.

As solvents I may use the aromatic hydrocarbons such as benzol, toluol, xylol and solvent naphtha and mixtures of these. Chlorinated rubber is also readily soluble in carbon bisulphide, carbon tetrachloride, trichlorethylene, chlorbenzol and the like but is not soluble in alcohol, acetone and solvents of this general type.

Perchlorinated rubber enables the preparation of a relatively concentrated solution in a moderately cheap solvent such as benzol. Rubber compounds of a lower stage of chlorination are less soluble and more colloidal or jelly-like as the degree of chlorination decreases and their tendency to dry to a hard finish is as a general rule decreased by diminished chlorine content. A coating composition usually is required to contain a substantial amount of solid material, that is it must not be largely solvent with very little solid substance to form a coating on evaporation but the solvent should be charged with sufficient solid material to effectually cover the surface. Perchlorinated rubber is of value in this respect and in addition to the qualities mentioned has the property of resisting strong acids to a notable degree. For example a film of the chlorinated rubber may be immersed in concentrated hydrochloric, nitric, sulphuric or hydrofluoric acids for a considerable time without impairment. Films kept in a 10 per cent solution of caustic soda in the cold have remained unchanged for months.

In order to prepare the coating composition in accordance with the present invention for example 50 parts of the perchlorinated rubber and 150 parts of benzol may be mixed and agitated warming slightly to facilitate solution. A clear syrupy product is obtained which may be applied with a brush or application may be made in other ways as by dipping, spraying and the like. Thinner solutions may be prepared by using more of the solvent and correspondingly thicker ones may be obtained by increasing the concentration of the chlorinated rubber.

While a solution such as is indicated in the foregoing is useful to form a protective coating for wood or metals which are to be exposed to acid fumes or for other purposes the present invention in one embodiment relates to a perchlorinated rubber solution containing an oil-soluble dye, the solution being adapted for coating straw hats to color the surface thereof and form a flexible coating having unusual powers of resistance to atmospheric conditions. Straw hat coating compositions intended for coloring purposes are generally made of shellac as the composition is required to be quick-drying and to form a hard tough surface. Shellac however is readily affected by water and other agencies and this is an objection.

A quick-drying composition adapted for coloring straw hats may be made from 50 parts by weight of perchlorinated rubber, 150 parts benzol and 3 parts of oil soluble orange dye.

A thinner solution may be made from 50 parts by weight chlorinated rubber, 250 parts benzol and 3 to 10 parts of an oil soluble dye.

The shades may be varied by the use of appropriate oil soluble colors to yield red, brown, blue, black and other coatings as desired.

The chlorinated rubber solution is found to adhere readily to the straw and not to ripple on drying or form drops due to surface repulsion. Hence the composition is eminently suited for coating straw or straw hats, willow, ratan and other fibrous material of this general character which is subjected to considerable bending but which does not call for the flexibility of cloth. Any coating composition which is applied to a surface that is not rigid but is likely to be bent more or less must be free from brittle qualities otherwise the surface would quickly crack or craze. In addition to the adherent qualities noted the chlorinated rubber solution possesses a quality of toughness which makes it eminently adapted for the specified purpose.

The foregoing illustration is of course capable of numerous modifications with respect to the solvent and additions of various substances in greater or less proportion to modify the gloss, change the rate of drying or accomplish other desired effects. Thus for example Chinese wood oil or linseed oil, various resins, softening agents such as diethylphthalate and the like may be introduced.

What I claim is:—

1. A solution of a chlorinated rubber having substantially over 66⅔% chlorine content, containing a coloring agent.

2. A solution of chlorinated rubber of over 66⅔% chlorine content, in a solvent of the benzol type carrying an oil-soluble dye.

3. A composition adapted for coating straw hats which comprises a solution of a chlorinated rubber containing substantially over 66⅔% chlorine, in a volatile solvent and coloring matter also soluble in said solvent.

4. A coating composition comprising a coloring agent, a chlorinated rubber containing substantially over 66⅔% chlorine, and a solvent vehicle.

5. A liquid coating composition comprising a solution of highly chlorinated rubber containing substantially over 66⅔% of chlorine, such solution being of not substantially below 25% concentration.

6. A liquid coating composition containing a volatile solvent and a chlorinated rubber containing more than 66⅔% of chlorine the chlorinated rubber solution being of over 16% concentration.

CARLETON ELLIS.